United States Patent Office 3,047,552
Patented July 31, 1962

3,047,552
VULCANIZATION OF ELASTOMERS
Richard J. Reynolds, Walnut Creek, and Sven H. Ruetman, Oakland, Calif., assignors to Shell Oil Company, a corporation of Delaware
No Drawing. Filed May 25, 1959, Ser. No. 815,275
16 Claims. (Cl. 260—88.2)

This invention relates to the vulcanization of certain synthetic elastomers. More particularly, it relates to methods of vulcanizing elastomeric copolymers of mono-olefins.

In Irish patent application 695/56, published January 9, 1957, there are described processes for producing synthetic elastomers by the copolymerization of mono-alpha-olefins having up to six carbon atoms. The resulting copolymers, as the Irish patent application points out, are true copolymers as distinguished from physical mixtures of homopolymers. Further, the copolymers are characterized as being normally amorphous which, on stretching, crystallize. The crystallizable feature of the elastomers indicate that they may be useful, after vulcanization or curing, as synthetic rubbers. However, the Irish patent application does not disclose how the elastomers may be vulcanized and on considering the elastomeric copolymers in greater detail it will be seen that the means of accomplishing a cure of the elastomers is not readily apparent because they are free, or essentially free of ethylenic unsaturation. The lack of unsaturation means that, as a practical matter there are no sites at which vulcanization can take place.

Other publications have dealt with methods of introducing vulcanizable sites into the elastomeric copolymer. One such proposal has been to carry out the processes for the production of the elastomeric copolymer in the presence of a third unsaturated monomer, as acetylene, and in that way the third unsaturated monomer would interpolymerize to introduce vulcanizable unsaturation into an elastomeric copolymer. This technique however has not been demonstrated to be operable and indeed it is likely other complications would arise that would defeat or prevent the introduction of unsaturation. Still other techniques have been proposed but none of them, as far as is known, have been demonstrated to be operable to the extent that a useful synthetic elastomer of mono-olefin copolymer is produced.

In this description whenever reference is made to "elastomeric copolymers of mono-olefins" or words of similar meaning, it is to be understood that reference is had to copolymers of at least two olefins of the formula $$CH_2=CHR$$

where R is hydrogen or an alkyl radical having up to four carbon atoms. Representative mono-olefins include ethylene, propylene, butene-1, pentene-1, hexene-1, 4-methylpentene-1, and the like. Representative elastomeric copolymers include ethylene-propylene, ethylene-butene-1, ethylene-pentene-1, propylene-hexene-1 and the like. In a preferred embodiment the elastomers are prepared with ethylene and one other mono-olefin having up to 6 carbon atoms and particularly preferred are the elastomeric copolymers of ethylene and propylene. For the sake of brevity and because the present invention applies equally to the elastomeric copolymers of the type mentioned above, the invention will be described mainly as it relates to the most preferred embodiment of the ethylene-propylene elastomers.

It is an object of this invention to provide novel methods for vulcanizing elastomeric copolymers of mono-alpha-olefins. It is still another object of this invention to provide novel methods for vulcanizing elastomeric copolymers of mono-alpha-olefins, which elastomers are free or essentially free of ethylenic unsaturation. It is yet another object of this invention to provide such vulcanizates which exhibit the properties of useful rubber. Other objects will become apparent as the description of the invention proceeds.

These and other objects are accomplished by the method of vulcanizing elastomeric copolymers of mono-alpha-olefins having up to 6 carbon atoms, the copolymer being crystallizable on stretching and being essentially free of ethylenic unsaturation comprising blending the elastomer with (1) an organic peroxide and (2) a quinone or quinone precursor as a hydroquinone or quinhydrone and mixtures thereof, and thereafter vulcanizing the composition at elevated temperatures. The vulcanizate which is achieved with the peroxide and the quinone or quinone precursor will be found to be a highly useful synthetic rubber which had advantages not afforded by prior art synthetic elastomers.

The elastomeric copolymers, as previously indicated, may be prepared by the procedures and techniques described in Irish patent application 695/56 and those processes for the preparation of the elastomeric copolymers, and the copolymers themselves, form no part of this invention. However, for the sake of convenience the processes for producing the copolymers will be briefly described here but reference may be had to the above mentioned Irish application for more detail.

In essence, the elastomeric copolymers are produced by polymerizing a mixture of monomers, as ethylene and propylene, in the presence of an inert hydrocarbon solvent with a catalyst that comprises the reaction product of a metallo-alkyl compound of groups I, II or III and a compound of a metal halide as vanadium chloride or vanadium oxychloride. The ratio of monomers, as ethylene to propylene, that is maintained during the polymerization will vary depending on the proportion of the respective monomers desired in the final elastomer. This in turn will vary depending upon the ultimate formulation desired in the vulcanizate. In any case in the preferred embodiments the elastomer may contain from about 20 mole percent to about 90 mole percent of ethylene units in the copolymer and still be useful in the formation of rubbers. Because the monomers do not polymerize at the same rate, i.e., ethylene polymerizes faster than propylene, the ratio of the starting mixture of monomer is not the same as that desired in the final product and this is one of the major considerations in selecting the starting monomer ratios to give a particular final product. Other considerations are the choice of catalyst components and their respective proportions and the polymerization conditions. By way of illustration Table I indicates variations of ethylene units in the final elastomer as the ratio of ethylene to propylene in the starting monomer mixture is varied. For this table, polymerizations were conducted at 45–65° C. in n-heptane solvent and the catalyst was the reaction product of trihexylaluminum and vanadium oxychloride in a mole ratio of 3.0:1.

TABLE I

| Mole Percent Ethylene in Feed Gases | Mole Percent Ethylene in Copolymer |
|---|---|
| 8.0 | 24.0 |
| 18.0 | 48.1 |
| 26.0 | 57.7 |
| 32.0 | 62.4 |
| 50.0 | 80.3 |

Other suitable alkyl aluminum compounds as the catalyst component include trioctyl aluminum, trinonyl aluminum, tridecyl aluminum, triisobutyl aluminum, and others. Preferably the alkyl radicals of the trialkyl aluminum have more than 4 carbon atoms but not more than 16 carbon atoms. For economic reasons, the number of carbon atoms in the alkyl radicals preferably range from 4 to 10. The ratio of the aluminum compounds to the vanadium oxychloride or vanadium tetrachloride may vary widely but preferably the aluminum to vanadium mole ratio is greater than 2. The catalyst is simply prepared by mixing and reacting the catalyst components in a hydrocarbon solvent whereupon there is formed a reaction product which is the catalyst.

The organic peroxide utilized as one of the components of the vulcanizing agent may be any organic peroxide. This definition excludes hydrogen peroxide which is not suitable for the purposes of this invention as it is not feasible to incorporate it into the elastomer. Also unsuitable are metallic peroxides, as calcium peroxide, as such compounds have decomposition temperatures that are too high so that they do not, in effect, generate the needed free radicals. While the mechanisms of this invention are not fully understood it is believed that the organic peroxide functions, in part, to form free radicals by abstracting hydrogen atoms from the saturated elastomeric copolymers. The resulting activated sites can then combine with each other to form carbon-to-carbon cross-linkages. It is at this point that the quinone come into play and it is believed that it assists or participates in cross-linking. Because the mechanisms of this invention contemplate that free radicals be created by the decomposing peroxide it will be seen that other compounds which can directly or indirectly supply free radicals may be similarly employed. Among such compounds there may be mentioned other peroxygen compounds such as persulfates, perborates, percarbonates and the like. Among the organic peroxides that may be employed mention is made of dicumyl peroxide, di-tert-butyl peroxide, tert-butyl cumyl peroxide, benzoyl peroxide, lauroyl peroxide, tetraline peroxide, urea peroxide, butyryl peroxide, tert-butyl-perbenzoate and the like. Although organic peroxides as a class are suitable for the purposes of this invention not all organic peroxides or peroxygen-type compounds are equivalent because of differences in decomposition rates inherent in their structure. This, in effect, means that the curing cycles of heat and pressure during vulcanization will require modification depending upon the choice of the peroxygen-type of compound used. Also to be considered is the effect of the residue of the peroxide on the ultimate physical properties of the vulcanized elastomer. In general those peroxides which have decomposition temperatures at or below vulcanization temperatures, are most preferred and more preferred are those that have decomposition temperatures ranging from about 5 to 40° C. below vulcanization temperatures. Vulcanization temperatures, as commonly understood in the art, range from 100 to 200° C. Thus, it will be seen that the choice of a particular peroxide very largely depends upon the vulcanization temperatures and such temperatures are largely a matter of choice that is made by a skilled rubber chemist after considering the composition of the unvulcanized rubber. Among the more suitable peroxides there may be mentioned dicumyl peroxide, tert-butyl cumyl peroxide, di-tert-butyl peroxide, lauroyl peroxide, and the like. In general lower molecular weight peroxides, as di-tert-butyl peroxide, are less preferred as they tend to evaporate at preferred processing and/or vulcanization temperatures. Nevertheless, such peroxides may be usefully employed by adsorbing the peroxide on materials, such as molecular sieves, which are otherwise not injurious to vulcanization, and/or by modifications in the formulation of the unvulcanized elastomer composition.

The quinone may be any substituted or unsubstituted quinone and it makes little difference whether the quinone is an ortho- or para-quinone although the latter are preferred. Also useful but less preferred are the corresponding hydroquinones or quinhydrones. Among the quinones the following are representative: 1,4-benzoquinone, 2-chloro-1,4-benzoquinone, 2,5- and 2,6-dichloro-1,4-benzoquinone, tetra-chloro-1,4-benzoquinone, duroquinone, 2-phenyl-1,4-benzoquinone, stibenequinone, 3,3', 5,5'-tetra-t-butylstilbenequinone, 3,3',5,5'-tetramethyl stilbenequinone, 4,4'-diphenoquinone, 3,3',5,5'-tetra-t-butyl-4,4'-diphenoquinone, 1,4-naphthoquinone, 1,2-naphthoquinone, 2 - methyl - 5,8,9,10 - tetrahydro - 1,4 - naphthoquinone, 2 - methyl - 1,4 - naphthoquinone, 2 - methyl-1,4-naphthoquinone oxide, anthraquinone, phenanthrenequinone, beta-methylanthraquinone, 1,4-dimethyl-anthraquinone, 1,2-benzanthraquinone, and the corresponding hydroquinones and quinhydrones. The quinones, hydroquinones or quinhydrones may further contain other functional groups as $-SO_3$ and $-NO_2$ without materially affecting the properties of the vulcanizates and in fact may assist in effecting cross-linking. In essence, however, all that is required are the essential quinone radicals or their precursors and in the preferred embodiments of quinones are employed. This preference is based strictly on cost considerations because the quinone precursors must first be oxidized to the quinones. Furthermore, the simple, lower molecular weight quinones are preferred since the quantities of the more complex quinones needed are generally higher. For these reasons 1,4-benzoquinone, 1,4-naphthoquinone, anthraquinone and benzanthraquinone are preferred.

The quantity of peroxide required to effect suitable vulcanization of the elastomers will vary depending on such considerations as the particular copolymer involved, the particular peroxide selected and the physical properties of the elastomer, particularly the ethylene content. Normally, the choice of peroxide will be influenced by the conditions of time, temperature and pressure to be used during vulcanization. Generally, amounts ranging from 0.1 to about 10 parts per hundred of elastomer will cover most cases. Amounts in the order of 1 to 5 parts per hundred will be suitable for the most preferred ethylene-propylene copolymers when they have I.V.'s ranging from about 1.0 to about 7.0, although with higher I.V.'s lesser amounts may be employed. The quinones are used in amounts on the order of 0.1 to 4 phr. The described amounts of these components refer to the pure or active ingredients and in most cases a simple calculation will be required to adjust for inert ingredients. When quinone precursors are used, some of the peroxide is consumed in converting it to the corresponding quinone and some allowance should be made for that consideration.

In the following examples the elastomer stock consists of ethylene-propylene copolymer prepared by the procedures previously indicated. In all cases the elastomer stock is milled with high abrasion furnace black, the indicated peroxide and the indicated quinone. The temperature of the mill rolls is about 20° C. but the milling stock is at about 40–60° C. The temperature of the milling rolls or the elastomer stock should not, in any event, be permitted to rise above the decomposition temperature of the peroxide. The milling is continued until a homogeneous blend is obtained. Thereafter the milled product is vulcanized at 153° C. for one hour and the indicated tests are performed.

*Example I*

This is a control experiment in which the ethylene-propylene copolymer contains 54.0% of polymerized ethylene, has a raw Mooney viscosity (ML 1+4, 212° F.) of 92 and an I.V. of 5.0 dl./g. measured in decalin at 150° C. The copolymer gum is milled for 5 hours to reduce the Mooney viscosity to 66. The same elastomer is then milled with 50 phr. of HAF and 3 phr. of 95% dicumyl peroxide and then cured at 153° C. for one hour. The cured specimen has the following stress-strain properties at 23° C.:

Tensile strength, p.s.i. ---------------------------- 2130
300% modulus, p.s.i. ---------------------------- 1330
Elongation at break, percent -------------------- 415
Extension set, percent -------------------------- 18

Example II

Another sample of the same elastomer as in Example I is milled with 50 phr. of HAF, 3 phr. of 95% dicumyl peroxide and 1 phr. of 1,4-benzoquinone. The cured composition has the following properties at 23° C.:

Tensile strength, p.s.i. ---------------------------- 3040
300% modulus, p.s.i. ---------------------------- 920
Elongation at break, percent -------------------- 595
Extension set, percent -------------------------- 30

Example III

The same formulation and cure as in Example II is used except that the benzoquinone is replaced by a chemical equivalent of 1,4-hydroquinone and the peroxide used is 3.5 phr. The resulting cured specimen has about the same properties as in Example II.

Example IV

The same formulation and cure as in Example II is used except that the benzoquinone is replaced by a chemical equivalent of 1,4-quinhydrone and the peroxide used is 3.25 phr. The resulting cured specimen has about the same properties with the tensile strength being slightly lower.

Example V

Following the same procedures as in Example II, the raw elastomer is milled with 50 phr. of HAF, 3 phr. of 95% dicumyl peroxide and 0.5 phr. of 1,4-benzoquinone. The cured composition has the following properties at 23° C.:

Tensile strength, p.s.i. ---------------------------- 3085
300% modulus, p.s.i. ---------------------------- 1290
Elongation at break, percent -------------------- 510
Extension set, percent -------------------------- 23

Example VI

The composition of Example III is formulated again except that the quinone is replaced with 0.5 phr. of tetrachloro-1,4-benzoquinone. The resulting cured elastomer properties are as indicated above except that the extension set is about 11% and the tensile strength is about 2900 p.s.i.

Example VII

In a series of runs using the formulation of Example II, except that various organic peroxides are used, it is determined that the peroxide will effect the stress-strain properties and the variations in the properties can be correlated to the half-life of peroxide at the vulcanization temperature. Generally, where inferior properties result at a given curing temperature, much better properties will be obtained by adjusting curing temperature. Further, the stress-strain properties will vary considerably depending on the content of polymerized ethylene in the copolymer.

Example VIII

In this series of experiments the ethylene-propylene elastomer contains 54.5% of polymerized ethylene. The raw elastomer, having a raw Mooney viscosity of 96 at 212° F. and an I.V. of 4.5 dl./g., is milled for 5 hours to reduce the raw Mooney viscosity to 66, and then compounded with 50 phr. of HAF and 3 phr. of the 95% dicumyl peroxide. The stress-strain properties at 23° C. of cured samples are as follows:

Tensile strength, p.s.i. ---------------------------- 1575
300% modulus, p.s.i. ---------------------------- 1025
Elongation at break, percent -------------------- 440
Extension set, percent -------------------------- 19

Example IX

Using the same elastomer as in Example VIII, 50 phr. of HAF, 3 phr. of 95% dicumyl peroxide and 1 phr. of 3,3',5,5'-tetra-t-butylstilbenequinone are milled and the resulting cured elastomer has the following stress-strain properties at 23° C.:

Tensile strength, p.s.i. ---------------------------- 2620
300% modulus, p.s.i. ---------------------------- 1300
Elongation at break, percent -------------------- 475
Extension set, percent -------------------------- 17

Example X

Using the same formulation as in Example VIII except that the stilbenequinone is replaced with 1 phr. of 3,3',5,5'-tetraisopropyl-4,4'-diphenoquinone. The stress-strain properties approximate those of Example VII with the tensile strength being about 2200 p.s.i.

Example XI

The stilbenequinone in Example IX, is replaced with 0.5 phr. of duroquinone and the resulting cured elastomer properties are as indicated in Example VI except the tensile strength is about 2200 p.s.i.

In a series of companion experiments it will be found that 1,4-naphthoquinone and anthraquinone will produce similar results as in Example II. It is further found that the stress-strain properties are generally less at constant conditions as the substitutions on the quinone nucleus become more complex, or increase in molecular weight. Further it is found to be preferable to use quinones that are free of hindrance at the positions adjacent to the quinone radical and if hindrance is to exist it is desirable that it be minimized by the use of less hindred quinones. Thus, tertiary-butyl hindrance is less preferred than isopropyl hindrance. Irrespective of these considerations, it will be appreciated that the disadvantage of a particular quinone may be largely overcome by adjusting its concentration or by changing the cure cycles by increasing curing times and/or temperature.

In general, the stress-strain properties except extension set are better when the copolymer contains a higher proportion of ethylene. However, processability decreases with increasing ethylene content and a compromise between processability and maximum stress-strain properties must be made. Further, as the ethylene content increases beyond about 80 mole percent, the resilience decreases while the tensile strength remains high. By about 90 mole percent of polymerized ethylene, the resilience is quite low. By way of illustration, when the elastomer contains about 76% of polymerized ethylene the tensile strength may reach about 4800 p.s.i. when reinforcing HAF is used together with the peroxide and quinones as indicated above.

It wil be readily understood that considerable variations in the stress-strain properties can be achieved by varying the composition of the elastomer, nature of the reinforcing carbon black, of which HAF is merely representative, the organic peroxide and the quinones and their respective amounts. In any case, suitable vulcanizates will be provided when the organic peroxides and the quinones are used as the curing agents. Further, synthetic elastomers of the mono-oelfin copolymers may ultimately be formulated with a large variety of known rubber chemicals such as accelerators, activators, antioxidants, plasticizers, softeners, tackifiers, fillers, diluents, pigments and the like. Such formulations in no way detract from the ability of the present invention to cause the raw elastomer composition to be vulcanized. This applies not only to ethylene-propylene elastomeric compositions but also to others of the type described in the previously mentioned Irish patent application.

Example XII

An elastomeric ethylene-pentene-1 copolymer containing about 48% polymerized ethylene is milled with 50 phr. of HAF, 3 phr. of tert-butyl cumyl peroxide and 2 phr. of 1,4-naphthoquinone. The resulting blend is subjected to vulcanization at 165° C. for 60 minutes and the resulting product is found to have been cured.

We claim as our invention:

1. A method of vulcanizing elastomeric copolymers of mono-alpha-olefins having up to 6 carbon atoms, the copolymer being essentially free of ethylenic unsaturation and containing from about 25 to about 90 mole percent of polymerized ethylene, comprising blending the copolymer with (1) from 0.1 to 10 parts per hundred of elastomer of an organic peroxide having a decomposition temperature between 100 and 200° C. and (2) from 0.1 to 4 parts per hundred of copolymer of a compound selected from the group consisting of quinones, hydroquinones, quinhydrone, and mixtures thereof, and vulcanizing the blend, the said peroxide and said compound being in parts by weight per hundred parts by weight of copolymer.

2. The method of claim 1 in which the quinone is 1,4-benzoquinone.

3. The method of claim 1 in which the quinone is 1,4-naphthoquinone.

4. The method of claim 1 in which the quinone is anthraquinone.

5. The method of claim 1 in which the quinone is 2,6-dichloro-1,4-benzoquinone.

6. The method of claim 1 in which the quinone is 2,5-dichloro-1,4-benzoquinone.

7. A method of vulcanizing elastomeric ethylene-propylene copolymers, the copolymer being essentially free of ethylenic unsaturation and containing from about 25 to about 90 mole percent of polymerized ethylene, comprising blending the copolymer with (1) from 0.1 to 10 parts per hundred of elastomer of an organic peroxide having a decomposition temperature between 100 and 200° C. and (2) from 0.1 to 4 parts per hundred of copolymer of a compound selected from the group consisting of quinones, hydroquinones, quinhydrone, and mixtures thereof, and vulcanizing the blend, the said peroxide and said compound being in parts by weight per hundred parts by weight of copolymer.

8. The method of claim 7 in which the quinone is 1,4-benzoquinone.

9. The method of claim 7 in which the quinone is 1,4-naphthoquinone.

10. The method of claim 7 in which the quinone is anthraquinone.

11. The method of claim 7 in which the quinone is 2,6-dichloro-1,4-benzoquinone.

12. The method of claim 7 in which the quinone is 2,5-dichloro-1,4-benzoquinone.

13. A method of vulcanizing elastomeric ethylene-propylene copolymers, the copolymer being essentially free of ethylenic unsaturation and containing from about 25 to about 90 mole percent of polymerized ethylene, comprising blending the copolymer with (1) from 0.1 to 10 parts per hundred of elastomer of dicumyl peroxide and (2) from 0.1 to 4 parts per hundred of copolymer of a compound selected from the group consisting of quinones, hydroquinones, quinhydrone, and mixtures thereof, and vulcanizing the blend, the said peroxide and said compound being in parts by weight per hundred parts by weight of copolymer.

14. The method of claim 13 in which the quinone is 1,4-benzoquinone.

15. The method of claim 13 in which the quinone is 1,4-naphthoquinone.

16. The method of claim 13 in which the quinone is anthraquinone.

References Cited in the file of this patent

UNITED STATES PATENTS

| | | |
|---|---|---|
| 2,826,570 | Ivett | Mar. 11, 1958 |
| 2,845,411 | Willis | July 29, 1958 |
| 2,888,424 | Precopio et al. | May 26, 1959 |

FOREIGN PATENTS

| | | |
|---|---|---|
| 453,480 | Canada | Dec. 21, 1948 |

OTHER REFERENCES

Whitby: Synthetic Rubber, Wiley and Sons (N.Y., 1954), page 390.

Kresser: Polyethylene, Reinhold (N.Y., 1957), pages 2, 3 and 9.